United States Patent
Goldrian et al.

[11] Patent Number: 5,872,944
[45] Date of Patent: Feb. 16, 1999

[54] BUS WITH REQUEST-DEPENDENT MATCHING OF THE BANDWIDTH AVAILABLE IN BOTH DIRECTIONS

[75] Inventors: Gottfried Andreas Goldrian, Boeblingen; Hans-Werner Tast, Schonbuch, both of Germany

[73] Assignee: International Business Machines Corporation, Armonk, N.Y.

[21] Appl. No.: 712,033

[22] Filed: Sep. 11, 1996

[51] Int. Cl.$^6$ ............................................ G06F 13/40
[52] U.S. Cl. .................................. 395/306; 395/851
[58] Field of Search ............................. 395/306, 307, 395/308, 311, 851

[56] References Cited

U.S. PATENT DOCUMENTS

| | | | |
|---|---|---|---|
| 4,545,049 | 10/1985 | Kammerer et al. | 370/16 |
| 4,573,120 | 2/1986 | Ichimiya et al. | 364/200 |
| 4,707,673 | 11/1987 | Lee et al. | 333/112 |
| 5,195,089 | 3/1993 | Sindhu et al. | 370/85.1 |
| 5,373,467 | 12/1994 | Wang | 365/189.02 |
| 5,499,383 | 3/1996 | Yamasaki | 395/842 |
| 5,555,440 | 9/1996 | Oppat | 395/306 |
| 5,608,882 | 3/1997 | Abert et al. | 395/307 |
| 5,613,078 | 3/1997 | Kishigami | 395/306 |
| 5,649,127 | 7/1997 | Hang | 395/307 |
| 5,668,956 | 9/1997 | Okazawa et al. | 395/306 |

*Primary Examiner*—Meng-Ai T. An
*Assistant Examiner*—Xuan M. Thai
*Attorney, Agent, or Firm*—Marc A. Ehrlich

[57] ABSTRACT

A method for improved use of bandwidth on a bus. A bus, such as a processor bus between a processor and an L2 cache, is established having two states: a first state in which one half of the bus allows transmission in one direction and the other half allows transmission in the opposite direction; and a second state in which the entire bus bandwidth comprising both bus halves allow transmission in one direction. To achieve this bus design, means are provided for selectively switching at least one of the bus halves' transmission directions.

10 Claims, 11 Drawing Sheets

|  | TAG LINE 1A OR 1B | TAG LINE 2A OR 2B |
|---|---|---|
| OP_ID | 1 | 1 |
| OP_IM | 1 | 0 |
| DATA | 0 | 1 |
| NOOP | 0 | 0 |

BUS WITH REQUEST-DEPENDENT MATCHING OF THE BANDWIDTH AVAILABLE IN BOTH DIRECTIONS

The invention concerns a bus for the transmission of information in a data processing system, as well as a procedure for the transmission of data through a bus in a data processing system.

In order to transmit information between functional units in a data processing system, bus systems are known which allow data transmission in only one direction, so-called unidirectional buses.

The application of bi-directional buses which possess two possible transmission directions between two functional units A and B is also known. Information may be transmitted either on the full bandwidth of the bus from A to B, or from B to A. Therefore, when there is a pending transmission of information, the sender must first have the right to send assigned to the bus before the data can be transmitted.

This mode is poorly suited to the transmission of time-critical commands, since queuing delays occur until the right to send is assigned. Short instructions for the synchronization and timing of a protocol process are especially time critical.

Dedicated command buses as well as a number of control lines have therefore been introduced for the transmission of these commands. In this way, the correct communication of the commands while observing the time limits was possible, although the expense for circuits for this type of bus was considerable.

In multiprocessor systems especially, where many processors must be linked by means of processor buses with a common L2 cache, the available pins on the L2 are limited. For reasons of connector technology, the number of these pins cannot be increased at will. Therefore, the better a high transmission bandwidth between the cache and processor can be executed with a low number of lines, the more processors can be coupled to the L2.

The object of the invention is thus to make a bus available which, on the one hand, can transmit time-critical commands between the transmission partners while observing time limits, and secondly, which uses the available bus lines optimally in regard to the transmission bandwidth.

This object is achieved in accordance with the invention by a bus which has an initial status in which the transmission lines are divided into two groups with opposite transmission directions, whereby the transmission direction of at least one group of transmission lines is reversible, which has a second status in which the transmission direction of the two groups of transmission lines is the same, and which has means for switching the bus between the initial status and the second status.

The object is furthermore achieved through a procedure in which the transmission lines of the bus are divided into two groups, and whereby there is a switching reversal from an initial status in which the two groups have opposite directions of transmission to a second status in which the transmission direction of the two groups of transmission lines is the same.

In the initial status of the bus, commands can be transmitted in both directions without delay. Through this it is possible to use the split bus for transmission of commands. When a data transmission is to occur, it is possible to convert over to the second status of the bus, in which the transmission direction of both groups of bus lines is the same. Data may thus be transmitted as required with the full bandwidth of the bus. In this manner, the flexible matching of the bus bandwidth to the specific requirements is possible.

In a further beneficial configuration of the invention, the transmission lines of the one group of transmission lines are bi-directional lines whose transmission direction is reversible, and the transmission lines of the other group of transmission lines are unidirectional lines whose transmission direction is fixed.

The benefit of this embodiment is that it is possible to convert from one half of the bus bandwidth to the full bandwidth in one direction of the bus. In this way, an advantageous transmission mode for that bus direction in which the greatest portion of the data exchanges takes place may be designed. Due to the fact that one half of the bus consists of unidirectional lines, the hardware expense for an implementation of this solution is significantly less than for a bus in accordance with the state of the art, in which all of the lines must be implemented as bi-directional lines.

In a further beneficial embodiment of the invention, the transmission lines of both groups of transmission lines are bi-directional lines whose transmission direction is reversible. In this solution, a conversion from a data transmission with half of the bandwidth to a data transmission with full bandwidth may take place in both bus directions. This allows especially flexible dimensioning of the bandwidth required for the command and data transmission. This solution is especially beneficial in systems in which the data volumes to be transmitted are approximately the same in one direction as the other.

In a further embodiment of the invention, there is at least one tag line present for each of the two transmission directions, whereby the status of the tag line specifies the type of the information transmitted on the bus.

In this manner, type-specific processing of the transmitted data may take place on the receive side. Especially, it is possible to write the received information immediately into the correct register.

In a further embodiment of the invention, the reversal between the initial status and the second status takes place as a function of the status of the tag line.

In this manner, a request to receive allocation of the full transmission bandwidth can be quickly communicated between the partners in the transmission.

In a further embodiment of the invention, the reversal between the initial status and the second status takes place as a function of the information which is to be transmitted through the bus.

In this embodiment, tag lines which are specifically responsible for the conversion of the bus from the initial to the second status, and the opposite, are eliminated. In this way, pins are saved.

In a further beneficial embodiment of the invention, the transmission of tag signals through the tag lines takes place a fraction of a timing cycle earlier than the transmission of information through the bus.

In this way, the time available on the receive side to initiate the type-specific processing of the incoming bus signals is increased. It is also possible in this manner to initiate the pre-processing of the incoming information.

In a further beneficial embodiment of the invention, for the event that the bus is in the initial status, and that information is to be transmitted in the one transmission direction, but the bus is still active in the opposite direction, then conversion from the initial status to the second status is delayed until the bus activity in the opposite transmission direction is completed.

The benefit of this embodiment is, in the event that one half of the bus is occupied, a data transmission in the opposite direction may be begun with half bandwidth, and in the moment when the transmission on the opposite side is completed, there may be a conversion to the full bandwidth. This allows a highly flexible utilization of the bus.

The information transmitted between the functional units of a computer system can be categorized into four groups: there are first of all the commands through which the operations to be executed by a functional unit are specified. Together with these commands, data and memory addresses are transmitted as operands of the commands. In addition, control signals exist with which, first of all, the status of the functional units which are participating in the data transmission can be communicated, and also with which a synchronization of the data transmission takes place.

Figure 1:
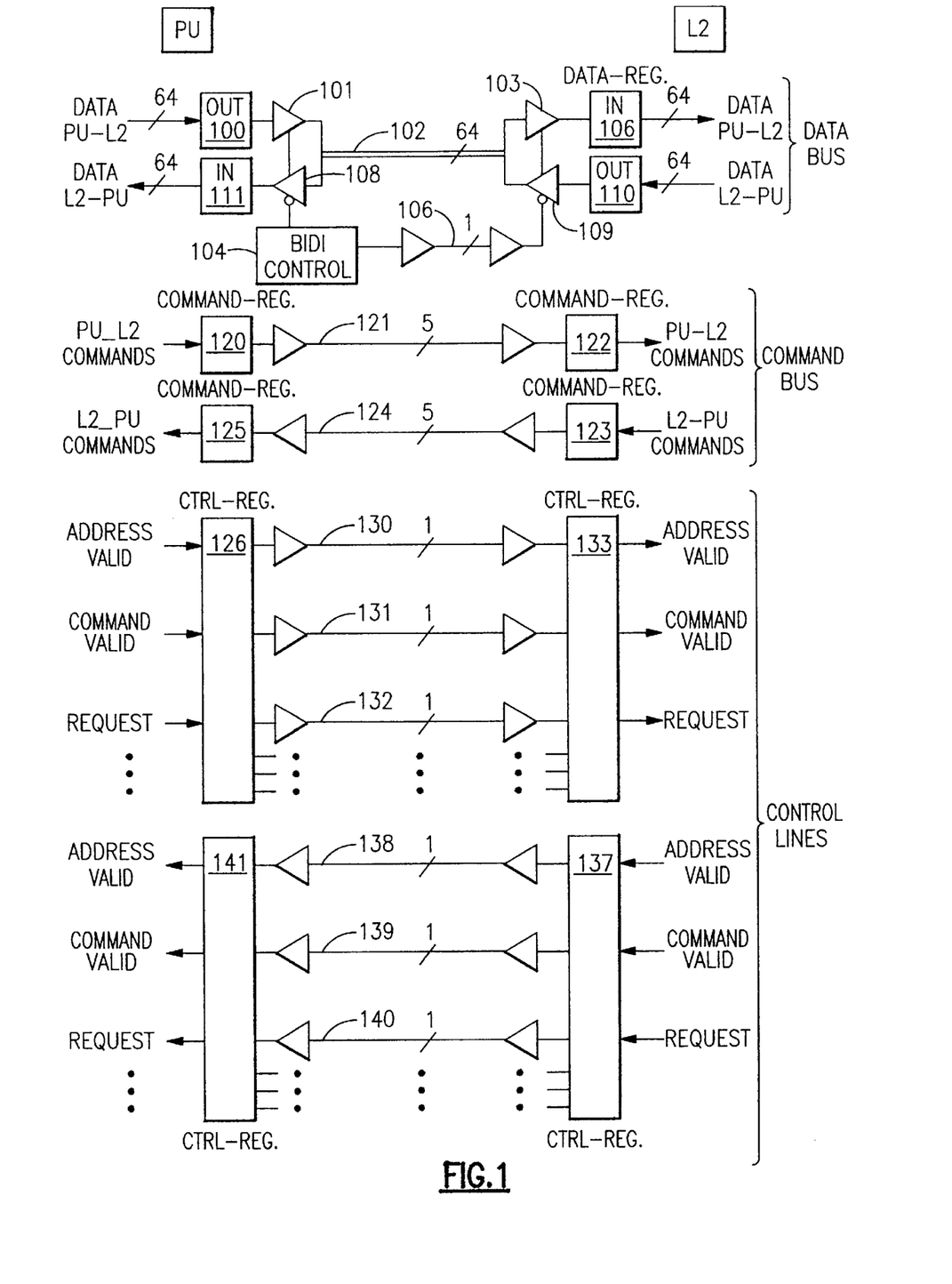
FIG. 1 depicts a bus structure which consists of a bi-directional data bus, two unidirectional command buses, as well as control lines in both directions.

A bus system in a computer must be able to transmit all four of the named information types in both directions. As an example for this type of bus system, a processor bus in accordance with the state of the art is depicted in FIG. 1. This processor bus links a processor with a second-level cache (the L2). The depicted bus is divided into three segments: into a data bus for transmission of data and/or addresses, a command bus for the transmission of commands, and into lines for the transmission of control information.

The data bus is implemented here as a bi-directional bus. This means that both partners participating in the data transmission, that is, the processor and the second-level cache chip, can be in possession of the right to send to the 64 data lines (102). If the processor wants to transmit data to the L2, these data are first written into the data-out register 100, from where—assuming that the processor has the right to send—they will be transmitted through the send driver 101, the bus lines 102 and the receiving side driver 103 to the data-in registers 106 on the receiving side, or on the side of the L2.

In the opposite instance, that is, when the second-level cache has the right to send, the data moves through the data-out register 110 of the L2, the sending-side driver 109, the bus line 102 and the receiving-side driver 108 to the data-in register 111 of the processor. Administration of the right to send is performed through a control unit 104 whose output signal is sent both to the processor-side send and receive drivers (107, 108) as well as to the send and receive drivers (109, 103) on the cache side. Depending on what level the output signal of the control unit 104 has, either the two drivers 101 and 103, or the two drivers 108 and 109, are activated. The output signal of the control unit therefore determines the data transmission direction on the data bus.

The lines of the two command buses, on the other hand, are unidirectional in design, that is, it is established from the beginning which of the two partners participating in the data transmission has the right to send. For transmission of commands from the processor to the second-level cache, the command is first written by the processor into the sending-side command register 120. From there it is transmitted through the five lines (121) of the command bus to the second-level cache, the incoming command is written into the command register 122 located there, from where it can be further processed. The sequence of events for the transmission of commands from the second-level cache to the processor corresponds to this. The command is again first written into the sending-side command register 123, from there it is transmitted through the unidirectional lines 124 to the processor, and then written into the processor-side command register 125.

Furthermore, an entire series of unidirectional control lines exist from the processor to the L2, and also from the L2 to the processor. Thus, for example, there is an 'address valid' control line (130, 138) in each of the two directions which indicates that valid address data are transmitted on the bi-directional bus. As an analogy to this, there is a 'data valid' control line in each of the two directions which indicates that the data transmitted on the bus are valid. The transmission of a command through the command bus is indicated by the application of 'command valid' (131, 139) to the respective control signal. Furthermore, there are request and response lines in each direction, lines for the indication of transmission errors, as well as additional control lines which have the task of ensuring the correct processing of the bus protocol.

The control signals are transmitted from the processor to the L2, in that they are written by the processor into a sending-side control register 126, travel from there through a sending-side driver, through the respective unidirectional control line to the receiving-side control register 133, from which they are read by the L2. The transmission of control signals from the L2 to the processor is analogous to this.

Figure 2A:
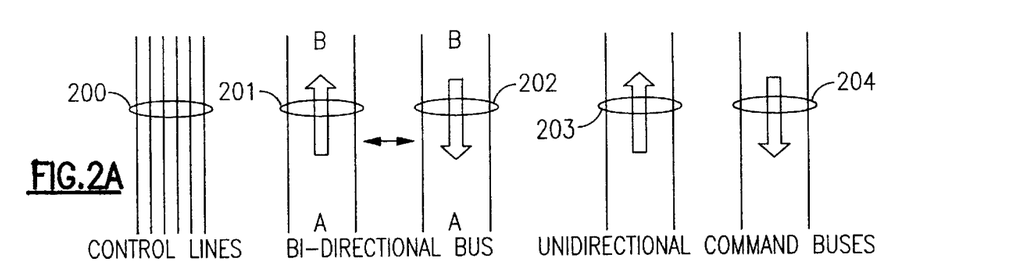
FIG. 2A represents again the bus structure depicted in FIG. 1 schematically.

The bus configuration described in FIG. 1, which corresponds to the current state of the art, is represented once again schematically in FIG. 2A. The right to send is assigned on the bi-directional data and address bus as a function of the commands which are transmitted on the two unidirectional command buses 203 and 204, and of the status of the control lines 200. For the bi-directional bus, there are two possible states. Let A and B be the two functional units linked by the bi-directional bus. In the first status 201, the unit A is in possession of the right to send on all bus lines, so that it can transmit data to B with the full bandwidth of the bus. In the second status 202, unit A is in the receiving mode, and unit B now has the right to send.

In order to convert from the first to the second status, or the other way around, it is necessary to reverse the direction of the data transmission on all of the bi-directional bus lines. This takes place by inverting the output signal of the BIDI control unit 104; however, this type of reversal of the direction of transmission of the bus requires several processor cycles.

In order to save signal lines and to make better use of the bus, it would be conceivable to transmit not only data and addresses between the units through the bi-directional bus, but also the commands. In this way, it is true, the two unidirectional command buses (203, 204) could both be completely eliminated, but the price one would have to pay for this would be a serious loss of performance. When a short instruction is to be sent from A to B, but another data transmission from B to A is being executed on the bi-directional bus, then the data transmission would first have to be interrupted or carried out to its completion, after which the transmission direction of the bus is changed, and only then could the short instruction be communicated from A to B. The delays created by this do not make this type of solution appear as very beneficial.

Figure 2B:
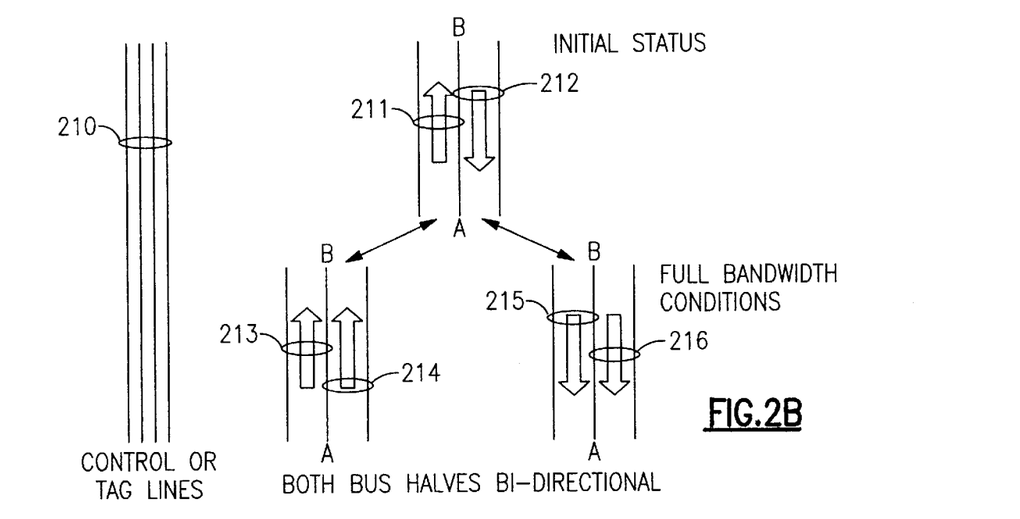
FIG. 2B depicts a bus structure in accordance with the invention, which includes a bi-directional bus for the transmission of data and commands in both directions as well as control or tag lines.

In the solution according to the invention, which is presented in FIG. 2B, these problems are solved by splitting the bi-directional bus. In the initial status of the bus, a data-transmission direction is planned from unit A to unit B for one half of the bus 211 or for one segment of the bus lines, while on the other half of the bus 212 or on the other segment of the bus lines, the data transmission takes place from B to A. With the initial status so defined, commands can be exchanged in a very rapid manner in both directions between the two functional units linked by the bus, since the time-consuming reverse switching of the bus is entirely eliminated. Commands, data and addresses can be communicated instantaneously on this bus which is split in its initial status, albeit only on half of the bus bandwidth. For short instructions and small volumes of data to be transmitted, the reduced bandwidth does not represent a serious disadvantage. It is only for large volumes of data which are to be exchanged between the units linked by the bus that an increase in the available bandwidth would be of advantage. On the processor bus which links a processor with the cache, large volumes of data only occur in association with the store command and the fetch command.

The ability to convert from the initial status of the bus to a status with full bandwidth by being able to invert the transmission direction on the one half (211) or the other half (212) of the bus as a function of the data to be transmitted is provided in accordance with the invention. For example, if a large volume of data is to be transmitted from A to B, then the transmission direction of bus half 211 is not changed (213), but the transmission direction of bus half 212 is changed (214). In this manner data can be transmitted from A to B across the entire bandwidth. When the data transmission is completed, the data transmission direction of bus half 214 is once again reversed (212) so that the initial status is once again achieved.

Analogous to this, there is the instance when a data volume is to be transmitted from B to A. In this instance the transmission direction of bus half 212 remains unchanged (216), while the transmission direction on bus half 211 is changed (215). Once again, the full bandwidth may be made available through this flexible bandwidth matching.

It is necessary to transmit control signals in addition to the commands, data and addresses in order to ensure the correct timing of the protocol operations with this bus concept also. For this, dedicated control lines 210 are provided again here. Nonetheless, the number of control lines as compared to the current state of the art can be significantly reduced. The reason for this is that the sending and receiving of commands, data and addresses cannot take place completely independently of each other, but rather take place on one and the same bus in a specific time sequence. As a result, no data can be transmitted during the transmission of a command, and during the transmission of data, certainly no address will be pending. Therefore, it is only necessary to specify the information pending for a bus by type, which can be accomplished by the utilization of appropriate coding with the help of a small number of tag lines. Due to the fact that commands, data and addresses are transmitted through a common bus and are thus necessarily sequential, then the number of necessary control lines can be lowered in addition.

Figure 2C:
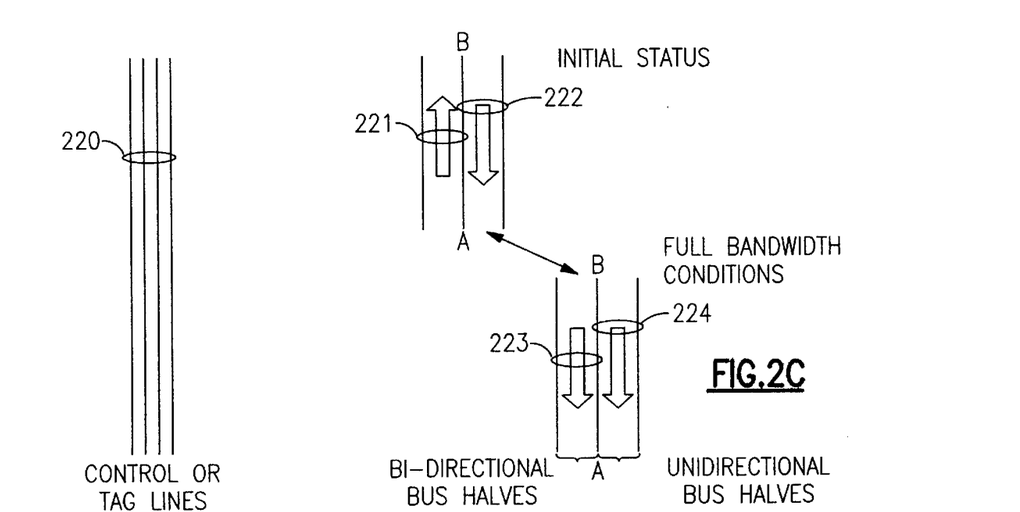
FIG. 2C depicts a special form of the bus structure in accordance with the invention, in which only one bus half consists of bi-directional lines, while the other bus half consists of unidirectional lines.

A variation of the solution for a new bus design in accordance with the invention is represented in FIG. 2C. Similar to FIG. 2B, the bus is split in its initial status into two halves (221, 222), whereby on the one half 221 a transmission of information from A to B is provided, and transmission from B to A is provided on the other half 222. Once again, matching of the bandwidth can be made as a function of the data to be transmitted, in contrast to the solution depicted in FIG. 2B, however, the change is only in one direction: only the transmission direction on bus half 221 can be inverted (223). Since the transmission direction on bus half 222 remains unchanged (224), the bus lines on this bus half may be designed as unidirectional lines. The hardware expense is thus significantly reduced, since only one bus half or one segment of the bus lines must be implemented as a bi-directional design.

In exactly the same manner as the solution in accordance with FIG. 2B, the number of required control lines 220 in accordance with FIG. 2C can be significantly reduced in comparison to the current state of the art, since in the bus structure depicted in FIG. 2C there is also a consequent necessary serialization of commands, data and addresses. A small number of control lines is adequate to specify the type of information pending on the bus appropriately.

If one wishes to apply the concept of implementing only one bus half as bi-directional to the processor bus between the processor and cache, then the question arises as to which of the two data transmission directions should have the possibility of utilizing full bandwidth. The two relevant commands for the transmission of data between the L2 and the processor are 'store' and 'fetch.' From statistical analyses it may be seen that a data transmission based on the fetch command takes place more than twice as frequently as a data transmission based on a store command. Therefore it is logical to provide for the option to switch to full bandwidth for data transfers from the L2 to the processor, since the more-frequent fetch command can then be correspondingly executed more quickly. A further reason for doing this results from the fact that the processor waits for the requested data after sending out a fetch request. The requesting processor can only continue with processing after the data have arrived. The result from this is that a data transmission ensuing from a fetch command directly influences performance, and this differentiates 'fetch' very significantly from 'store.'

Figure 3A:
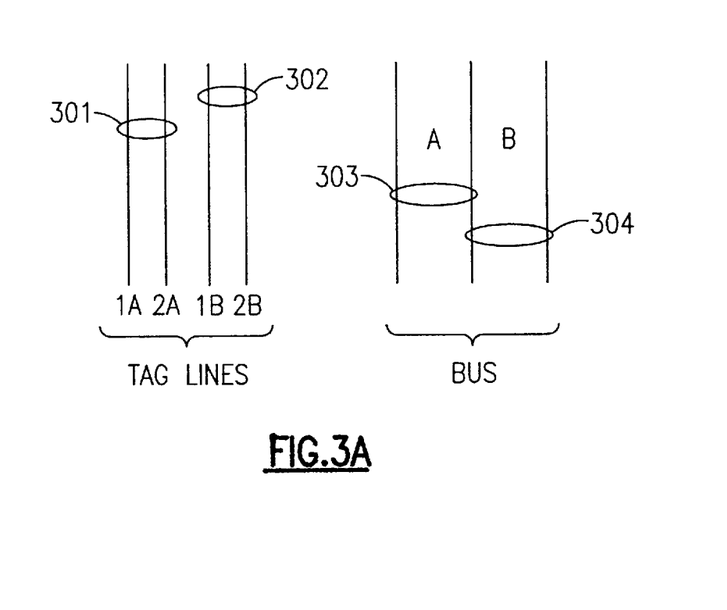
FIG. 3A represents how the individual tag lines can be assigned to the two bus halves.
Figure 3B:
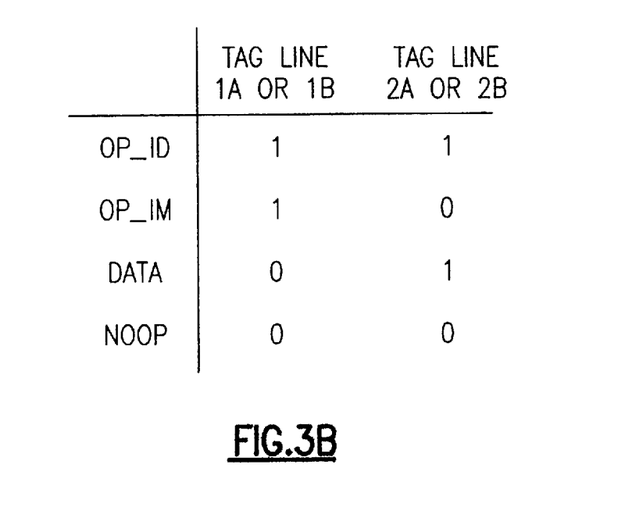
FIG. 3B depicts a possible way in which the information transmitted on the bus can be coded by means of tag lines.

An alternative FIG. 3A and FIG. 3B depict how the type of information transmitted by the bus in accordance with the invention can be specified by means of tag lines which are dedicated to this purpose. To do this, the two tag lines 1A and 2A (301) are assigned to bus half A (303) and the two tag lines 1B and 2B (302) are assigned to bus half B (304). In FIG. 3B, it is explicitly depicted by the use of an example how the type of transmitted information can be coded with the help of the tag lines. The abbreviation OP_IM stands for 'Immediate Operation' and designates short instructions which do not require further arguments or operands. When this type of 'Immediate Operation' is transmitted on the bus, tag line 1 (that is, line 1A for bus half A (303) or 1B for bus half B (304)) is on 'high,' while tag line 2 (that is, line 2A for bus half A (303) or 2B for bus half B (304) is on 'low.'

All commands and responses whose transmission requires more than one processor cycle are coded as 'Operation Identifiers,' abbreviated OP_ID. Address information which is transmitted together with the command or the response is also treated as an 'Operation Identifier.' For tag coding of this type of OP_ID, both tag lines, tag line 1 as well as tag line 2, are set on 'high.'

In case a data transmission should take place on a bus at the conclusion of command or a response, then this information type will be coded as 'data.' For this, tag line 1 is set to 'low,' and tag line 2 is set to 'high.'

In case there is no activity at the time, both tag lines, tag line 1 as well as tag line 2, are on 'low.' This bus status is designated as 'No Operation,' or NOOP for short.

In order to ensure normal data transmission on a bus, it is necessary to design the bandwidth of the bus in such a way that the bus is only partially utilized. Otherwise, commands and data transfers impede each other and the queuing delay which a command must run through before it can be given to the bus is too high on the average. Typically, a processor bus in a multi-processor system is only utilized approximately 30%, which means that the bus is idle during 70% of the time, that is, in a 'No Operation' status.

The manner of specifying information which is transmitted on a bus with the help of tag lines as depicted in FIG. 3B represents only one of many possible solutions. Thus it may be beneficial for reasons of transmission efficiency to implement some of the control lines described in connection with FIG. 1 with the bus concept in accordance with the invention also. For example, it could be beneficial to provide, in addition to the described tag lines, a request line and also a response line which indicate whether the transmitted OP_ID or OP_IM is a command or a response to a command. From the solution diagrammed in FIG. 3B, however, it is clear that even with a very small number of tag lines, a large number of information types transmitted on a bus can be coded.

Figure 4:
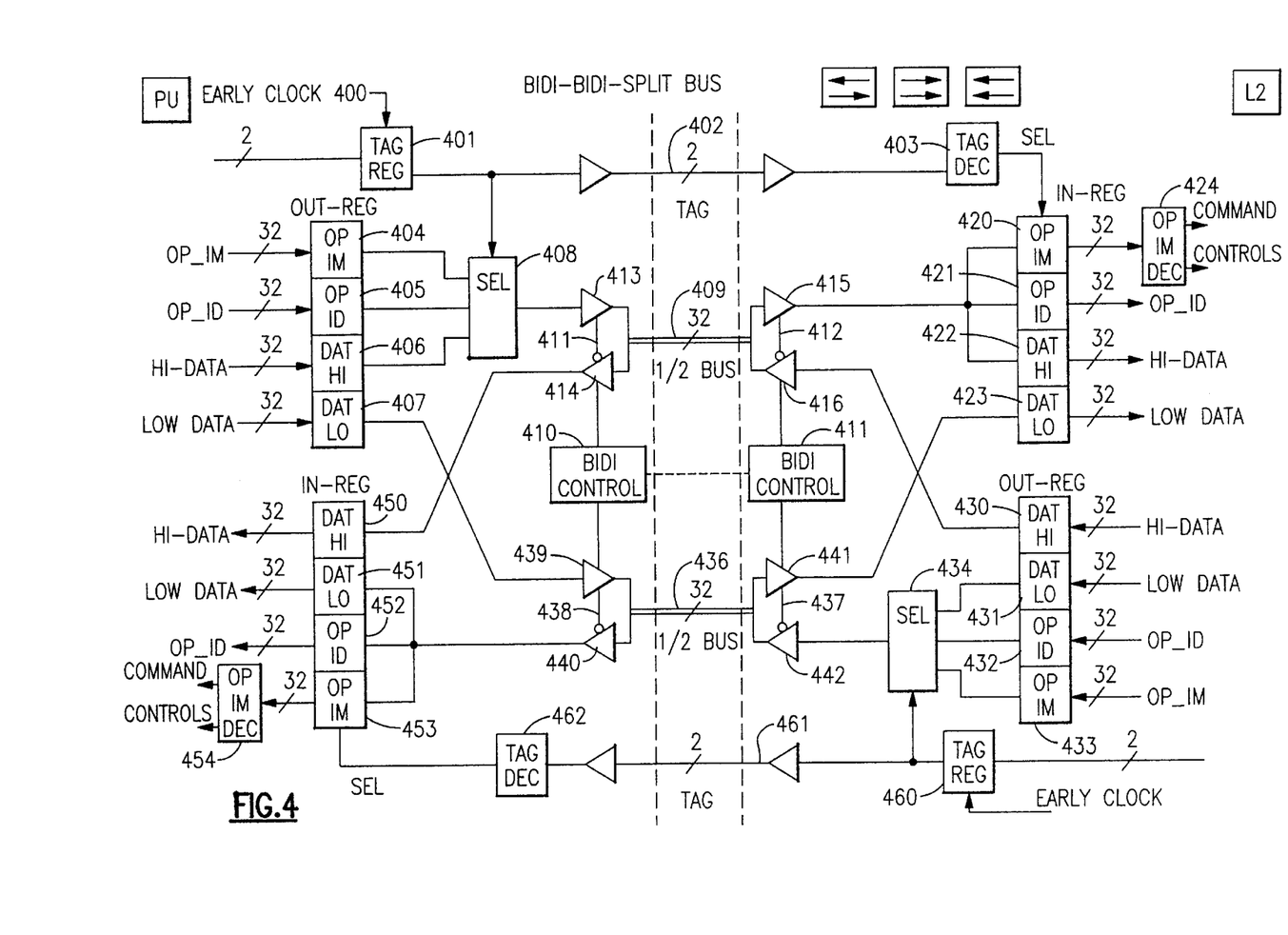
FIG. 4 depicts a technical implementation of the bus structure represented in FIG. 2B.

A hardware implementation of the bus concept in accordance with the invention is represented in FIG. 4. Each of the two bus halves consists of bi-directional bus lines, and thus the transmission direction of each of the two bus halves can be reversed. The solution represented thus corresponds to the solution depicted in FIG. 2B (BIDI—BIDI split bus). When the PU wants to send commands or data to the L2, it first writes the information which is to be communicated to a PU-side out register. There is a dedicated register (404, 405, 406) for each information type, for 'Immediate Operation,' for 'Operation Identifiers' as well as for 'Data.' The information type is also indicated by the tag status, which is stored in the tag register 401. This tag status controls a selector 408, through which the specific out register is selected whose contents will be transmitted through bus half 409. In order for a transmission from the PU to the L2 to be possible on bus half 409, it is necessary that the PU-side send driver 413 and the L2-side receive driver 415 are activated by their respective BIDI control units 410 or 411. This implies that the PU-side receive driver 414 and the L2-side send driver 416 are deactivated, because they have the output signals 411, 412 of the BIDI control units pending at their inverted inputs.

The information selected by the selector 408 according to the tag status is now written into a receive-side in register through the PU-side driver 413, bus half 409 and the L2-side receiver 415, whereby the status of the tag lines again selects the appropriate in register. A register for 'Immediate Operations' 420, a register for 'Operation Identifiers' 421, and a register for 'Data' 422 are available.

The data which have come in can then be processed further on the L2 side. To do this, for example, the contents of the register for 'Immediate Operations' 420 will be conveyed to an Immediate Operation Decode Unit 424 which decodes the incoming OP_IMs into commands and controls. The 'Operation Identifiers' which stand for commands, responses and addresses can be decoded in a similar manner.

The transmission of the tag information from the PU to the second-level cache takes place in the following manner: the two tag signals are written into the tag register 401. From there, they are transmitted through a send-side driver, through the actual tag lines 402 and a receive-side driver to a tag decode unit 403. The status of the tag lines is communicated first to the selector 408, which selects the information to be transmitted according to the tag, and the tag lines also serve for selection of the appropriate in register on the receive side.

It is beneficial to pulse the transmission of the tag information by means of an Early Clock whose rate impulses occur a fraction of a cycle earlier than the rate impulses of the system clock. In this manner, the transmission paths in the selector 408 as well as the appropriate in register on the receive side can already be determined before the actual data transmission, since this data transmission takes place with the system clock. The transmission of tag information which is early in comparison to the data transmission has the advantage in general of making information concerning the bus data available even before the arrival of the data, in order to be able to adequately process the incoming data immediately.

In the initial status of the bus, the first bus half 409 transfers information from the PU to the L2, while transmission on the second bus half 436 is in the opposite direction, that is, from the L2 to the PU. When there are data pending for transmission on the PU side which should be transmitted with full bandwidth, then the transmission direction of bus half 436 must be reversed. To accomplish this, the output signals 437, 438 of the BIDI control units 410, 411 are inverted so that the drivers 440 and 442, which were previously active, are deactivated, while the drivers 439 and 441 convert over to the active status. The four data bytes with the higher value are transmitted on bus half 409 from the PU to the L2 as before. The lower-value four data bytes, however, after they were written into the 'Data Low' register 407, are written through the driver 439, through bus half 436 and the driver 441 into the 'Data Low' receive register 423 of the L2, from where they can be processed further. After the conclusion of the data transmission, the bus is switched back to its initial status, and thus the transmission direction on bus half 436 changes back again.

The transmission in the opposite direction, that is, from the L2 to the PU, occurs in a corresponding manner. On the L2 side, out registers for 'Data High' 430, 'Data Low' 431, 'Operation Identifiers' 432 and 'Immediate Operations' 433 are available, into which the information to be transmitted is written by the L2. Through the tag-controlled selector 434, the driver 442, bus half 436 and the driver 440, the information then proceeds to the appropriate processor-side in registers for 'Data Low,' 451 for 'Operation Identifiers' 452, and for 'Immediate Operations' 453. The selection of the in register corresponding to the information type to be transmitted takes place as a function of the tag assigned to bus half 436. Data are transferred through two tag lines from the L2 through the tag register 460, through the two unidirectional tag lines 461 and the tag decoder 462 to the PU.

For data which are to be transmitted from the L2 to the PU, there is also the possibility of using the full bandwidth. To do this, the poles of bus half 409 are reversed by means of the BIDI controls 410, 411, after which the four higher-value data bytes can be transmitted through the 'Data High' out register (430), bus half 409 and the 'Data High' in register (450) to the PU. The four lower-value data bytes are transmitted through bus half 436 as before. At the conclusion of the data transmission form the L2 to the PU, the bus reverts back to its initial status.

Figure 5:
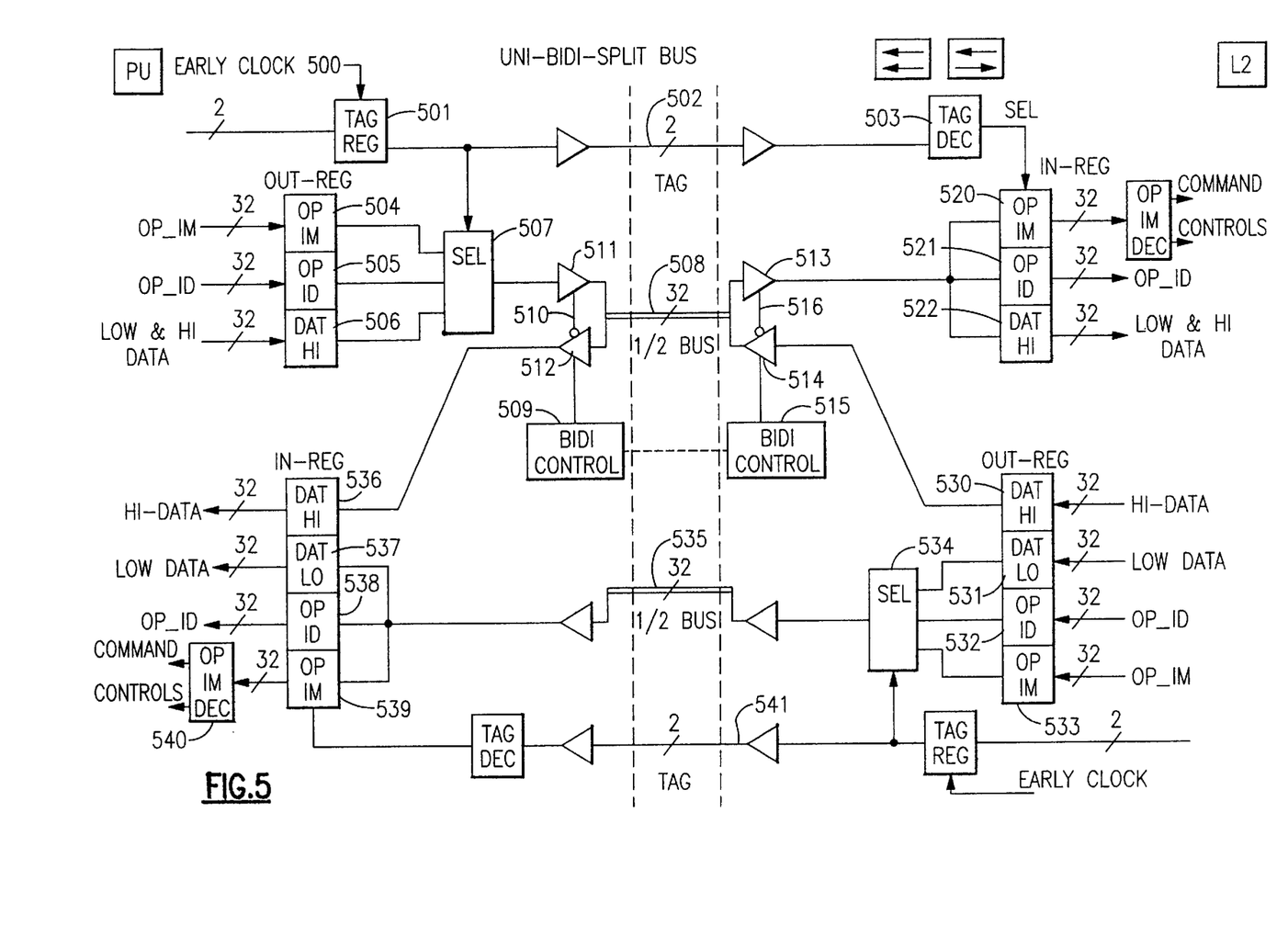
FIG. 5 represents a technical solution for the special form of the bus in accordance with the invention depicted in FIG. 2C.

A hardware implementation of the solution in accordance with the invention which is represented in FIG. 2C is depicted in FIG. 5. The one bus half 508 which transfers data and commands from the PU to the L2 is implemented bi-directionally here. As a result of this, the transmission direction of bus half 508 can be reversed as a function of bandwidth requirements; this corresponds to the two statuses 221 and 223 of the bi-directional bus halves in FIG. 2C. In contrast, the other bus half 535 consists of unidirectional data lines, and data transmission from the L2 to the PU is thus fixed. This corresponds to the unidirectional bus half 222, 224 in FIG. 2C.

Data and commands may therefore only be transmitted through half of the bandwidth from the L2 to the PU at all times. This is performed by the PU which writes information to be transmitted, that is, OP_IMs, OP_IDs and 'Data,' into the corresponding out registers 504, 505, 506. The type of information to be transmitted is specified by the tag; for this, the corresponding ID tag is written into the tag-register 501. This tag information serves first for the selection (507) of the register whose contents shall be transmitted, and secondly, the tag is transmitted through the two unidirectional tag lines 502 by means of the early clock 500 to the tag decoder 503 on the L2 side. In the initial status, data and commands are transmitted from the PU to the L2 by bus half 508. The output signal 510 of the BIDI control 509 activates the two drivers 511 and 513, while the two drivers 512 and 514, which have a pending inverted BIDI control signal, are deactivated. As a function of the tag status, the transmitted information is written into one of the three available in registers 520, 521, 522, which the L2 can access in order to continue to process the information. Since the second, unidirectional bus half cannot be used either in case there is a pending data transmission, it is necessary to transmit not only the four lower-value bytes but also the four higher-value bytes of the data ('Low Data' and 'High Data') through bus half 508.

In contrast, the use of both halves of the bus for data transmission is feasible in the opposite direction, that is from the L2 to the PU. For this, the drivers 512 and 514 must be activated by means of the BIDI controls 509 and 515 in order to convert from the initial status to a status of full bandwidth. The four low-value data bytes are written into the 'Data Low' out register 531, and the four higher-value bytes are written into the 'Data High' out register 530. The contents of the 'Data High' register can then be transmitted through bus half 508 to the processor-side in register 536, while the contents of the 'Data Low' register 531 are transmitted through the selector 534 and bus half 535 to the in register 537. For transmission of OP_IDs and OP_IMs, the use of bus half 508 is not necessary; transmission here is with half of the bandwidth.

The sequence of events of a typical data communication on a processor bus between the processor and the L2 cache is represented in FIGS. 6 to 11. In the event that several processors are linked through their respective processor bus with a common L2 cache (multi-processor system), the data communication also flows on each of the processor buses in accordance with the represented schematic.

Figure 6A:
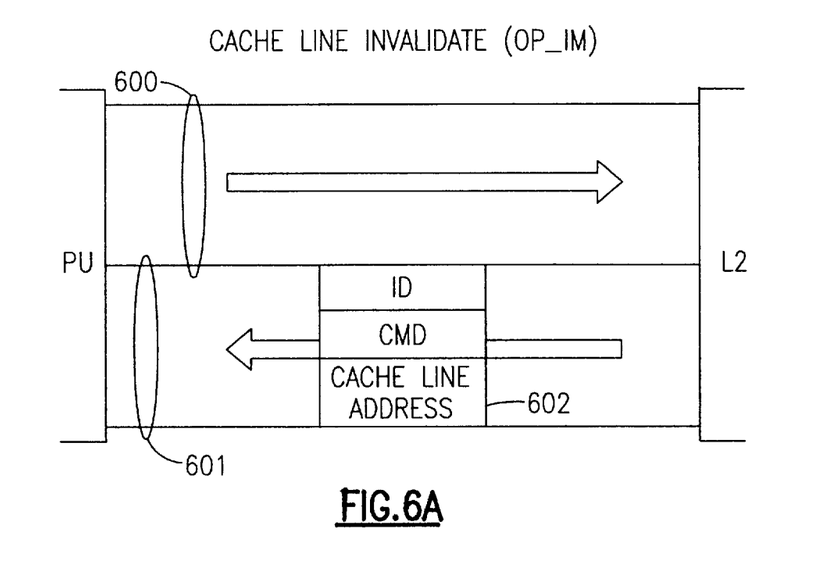
FIG. 6A depicts the sequence of operations of the 'cache line invalidate' command.
Figure 6B:
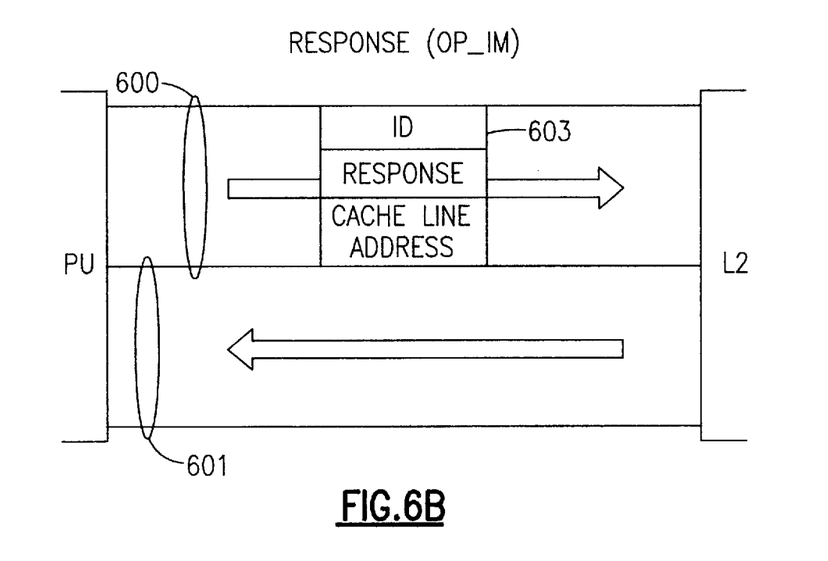
FIG. 6B represents the response to this command.

In FIG. 6A, the L2 transmits the command 'Cache Line Invalidate' (602) to a PU through bus half 601 which corresponds to bus half 436 in FIG. 4. The bus is in its initial status, and hence a transmission of information in the opposite direction, or on bus half 600, does not take place. The command 'Cache Line Invalidate' is transmitted from the L2 to all PUs in order to initiate an invalidation by the PUs of the affected cache line in the L1 caches assigned to them. An invalidation of the entities of the cache line in local memory may become necessary if one of the processors has signaled that it wants to overwrite the cache line in the L2, that is, it wants to initiate a memory access which affects this line. An additional reason can be that the cache line in memory in the L2 is to be deleted because of a Least Recently Used algorithm. For invalidation of the cache lines in the L1 caches assigned to the individual processors, it is necessary to communicate the memory address of the cache line to the PUs in addition to 'Cache Line Invalidate' command. Furthermore, an ID is assigned to this invalidation command. This short instruction is communicated to the PU as an 'Immediate Operation' (OP_IM, 602). In answer to this, the PU sends a response (603) to the L2, which in turn contains the ID as well as the cache line address. Half of the bandwidth is completely adequate for the communication of this response as well, as is depicted in FIG. 6B; the response to 'Cache Line Invalidate' is also an 'Immediate Operation.'

Figure 7:
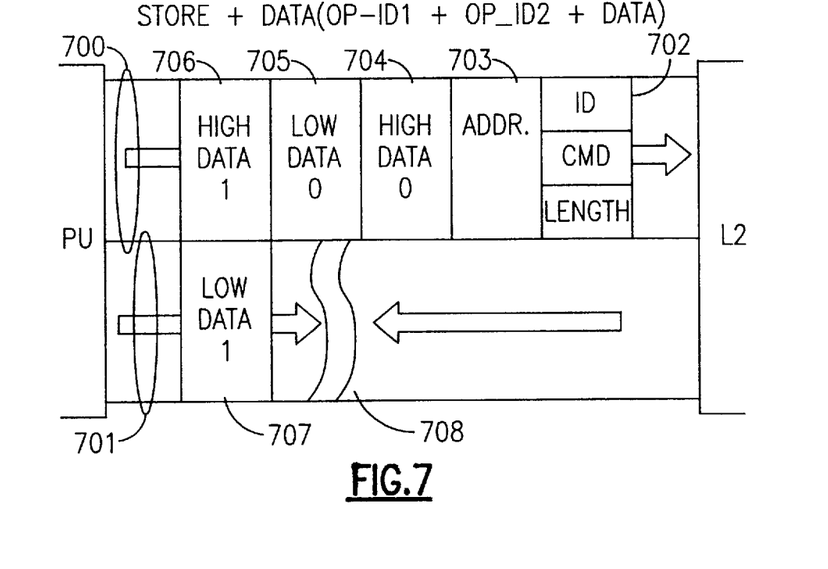
FIG. 7 represents the sequence of operations of the store command corresponding to the solution in accordance with the invention based on FIG. 2B.

If write access to the L2 or the memory is to be executed by a PU, the PU sends a store command, together with the data in memory to the L2. The sequence of operations of the store command is represented in FIG. 7 in the instance that both bus halves 700 and 701 are executed bi-directionally and therefore the transmission direction of bus half 701, which transfers data from the PU to the L2 in its initial status, can be changed. This corresponds to the solution in accordance with the invention based on 2B. For the execution of a store operation, it is necessary to transmit information about the length of the linked data packet as well as an ID in a first cycle (702), along with the command itself. In a second cycle (703), the destination address in memory from which the write process should be started is communicated. It may be beneficial to transmit the address in the first cycle, and not to communicate the command, ID and length until the second cycle, in order to make the destination address available earlier on the L2 side.

In the first two cycles, information is thus transmitted which specifies the operation to be performed in more detail. Thus the first two cycles are coded as OP_IDs, and the tag lines assigned to bus half 700 are both set on 'high.' The actual data transmission is started with the third cycle. Since only half of the bandwidth is initially available for data transmission, a full data pulse comprising 8 bytes is divided into its higher-value 4 bytes ('High Data,' 704) and its low-value 4 bytes ('Low Data,' 705). These data are then transmitted sequentially on the bus half. The coding on the tag lines has changed in the meantime from 'OP_ID' to 'Data,' that is, tag line 1 is set on 'low,' while tag line 2 is set on 'high.' In the event that there is no activity pending on bus half 701, which transfers information from the L2 to the PU in its initial status, then the transmission direction of this bus half may be reversed in order to use it for the data transmission. From the point in time at which the transmission direction of bus half 701 is reversed (708) the transmission of a full data pulse is possible in one cycle, 'High Data' (706) being transmitted on bus half 700 and 'Low Data' (707) being transmitted on bus half 701 from the PU to the L2. The tag coding in this transmission direction is not 'Data.' At the conclusion of the data transmission, the bus system converts back from a condition of full bandwidth to its initial status, that is bus half 701 transfers information once again from the L2 to the PU.

Figure 8:
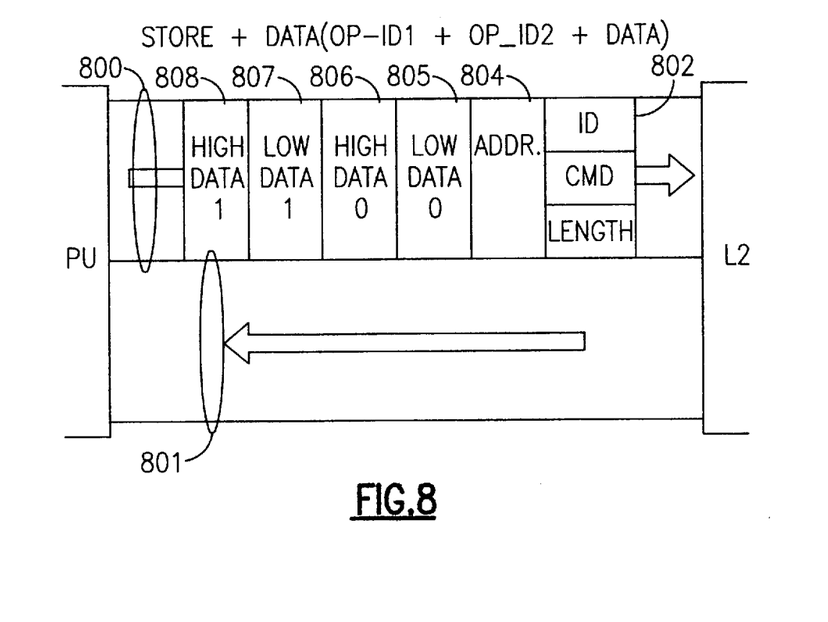
FIG. 8 depicts the sequence of operations of a store command when a bus structure according to FIG. 2C is implemented.

A modification of the store operation depicted in FIG. 7 for a bus system corresponding to that of FIG. 2C, which has a bi-directional bus half and a unidirectional bus half, is represented in FIG. 8. Here, the transmission direction of bus half 800, which in its initial status transfers information from the PU to the L2, can be changed, while bus half 801 is unidirectional and can transmit information only from the L2 to the PU. The actual data transmission here follows directly after the first two OP_IDs 802 and 803. Since only one bus half is available, each data pulse must be divided into 'High Data' (805 or 807) and 'Low Data' (806 or 808).

Figure 9A:
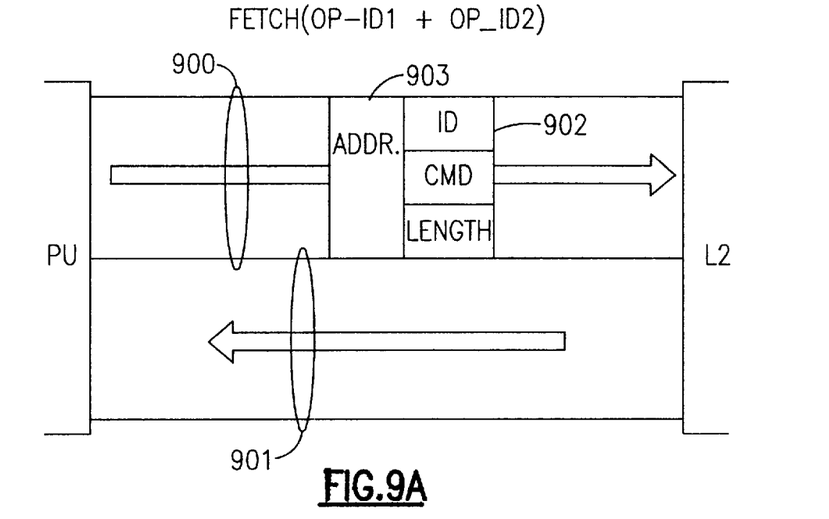
FIG. 9A depicts the sequence of operations of the fetch command.
Figure 9B:
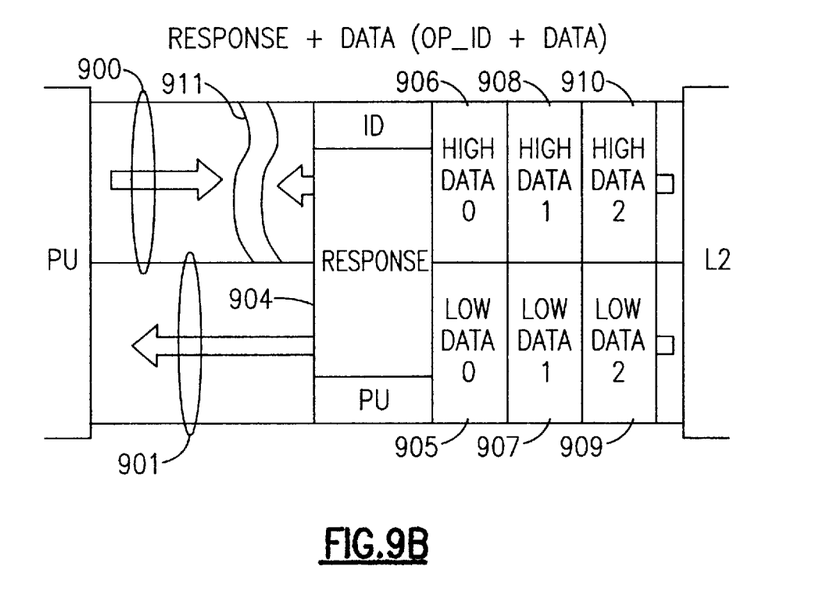
FIG. 9B represents the sequence of operations of the response to a fetch command as well as the data transmission to the processor unit ("PU").

The sequence of operations in a fetch process is represented in FIGS. 9A and 9B. When a PU requires data which it does not find in its local L1 cache, it sends a fetch command through bus half 900 to the L2. The fetch command consists of two 'Operation Identifiers' (902 and 903) which contain the ID of the fetch process, the fetch command itself, the length of the requested data packet and the start address of the required data. The bus is in its initial status for the transmission of the fetch process. After receiving the fetch command, the L2 begins to search in its directory for the requested cache line. If it finds the data (a hit), the required data can be transmitted immediately to the PU; in case the L2 does not find anything (a miss), then the cache line must be requested from memory.

Statistically viewed, more than twice as many fetch processes as store processes occur. The data transmission based on a fetch process therefore has a greater relevance than data transmissions based on store process. Furthermore, the PU has requested a specific cache line in order to be able to make the required arguments available for an operation. For this reason, the PU can only continue with processing after it has received the cache line. The result from both these arguments is that the full bandwidth should be available for a data transmission from the L2 to the PU.

It is therefore provided not only in the bus configuration based on FIG. 2B but also in that of FIG. 2C that it is possible to change the transmission direction for information on bus half 900 from the PU to the L2. This bus half 900 must therefore be implemented bi-directionally, while bus half 901 may be either unidirectional or bi-directional in design.

The response to a fetch command is represented in FIG. 9B. After the reversal of the transmission direction (911) on bus half 900, an OP_ID 904 is transmitted from the L2 to the PU in the first cycle. At the same time, the tag lines signal that an OP_ID is pending. The actual data transmission takes place in the next cycles. Since the full bandwidth is available, 'High Data' (906, 908, 910) and 'Low Data' (905, 907, 909) can each be transmitted in one cycle, that is, one data pulse can be transmitted per cycle. The tag lines indicate during this process that the transmitted information is 'Data.' After the completion of the data transmission, the bus reverts to its initial status as the transmission direction on bus half 900 is converted again.

The question now presents itself as to how the 'right to send' is assigned on the two bus halves, that is, which of the two bus participants, the PU and/or the L2, shall deliver the input for the BIDI controls depicted in FIGS. 4 and 5. One possibility is to provide dedicated (unidirectional) lines either for the PU only or for the PU and the L2 with which the respective bus participant signals whether it is prepared to allow the bus half assigned to it in the initial status to be assigned to the other partner or not. In the fetch response represented in FIG. 9B, this means that the L2 only can assume the right to send on bus half 900, which is assigned to the PU in its initial status, when the PU signals on the line assigned to it that it will not claim its right to send at the moment. If, however, there is a pending store operation waiting for execution on the PU side, the PU can prevent the L2 from receiving the right to send on bus half 900.

A solution of this type would by itself be completely adequate for the bus configuration depicted in FIG. 2C. For the bus configuration depicted in FIG. 2B, a dedicated control line is also provided for the L2, with the help of which the L2 can prevent the PU from receiving the right to send on its bus half. In the sequential flow of a store command depicted in FIG. 7, the PU could therefore only take over bus half 701 when the L2 has signaled that it does not want to send at that time.

In the place of dedicated control lines, the exchange of 'Immediate Operations' between the bus participants would also be possible in order to request and/or allow a change in transmission direction on a bus half.

The reversal of the transmission direction of a bus half requires at least two processor cycles, because the corresponding send and receive drivers must be activated or deactivated. Therefore, in order to have the full bandwidth available at the very beginning of the 'Response to Fetch,' it is useful if the PU begins with the reversal of the transmission direction of bus half 900 a few cycles after sending the fetch command (902, 903). Searching for and accessing the requested cache line in the directory on the L2 side also takes a few cycles. Consequently, it is possible to conclude the reversal of the transmission direction (911) after the beginning of the 'Fetch Response,' so that the full bandwidth is available for data transmission from the beginning. However, it can be meaningful to give the PU the right to prevent the reversal in the event that a store procedure to the L2 is about to take place. In this case, the communication of the fetch response would take place at least partially only through bus half 901.

Figure 10A:
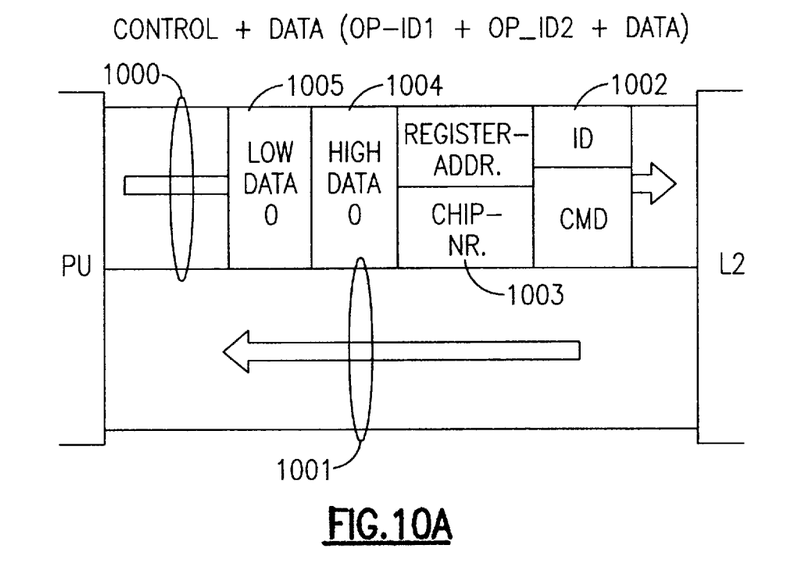
FIG. 10A depicts the transmission of the control command through the bus according to the invention.
Figure 10B:
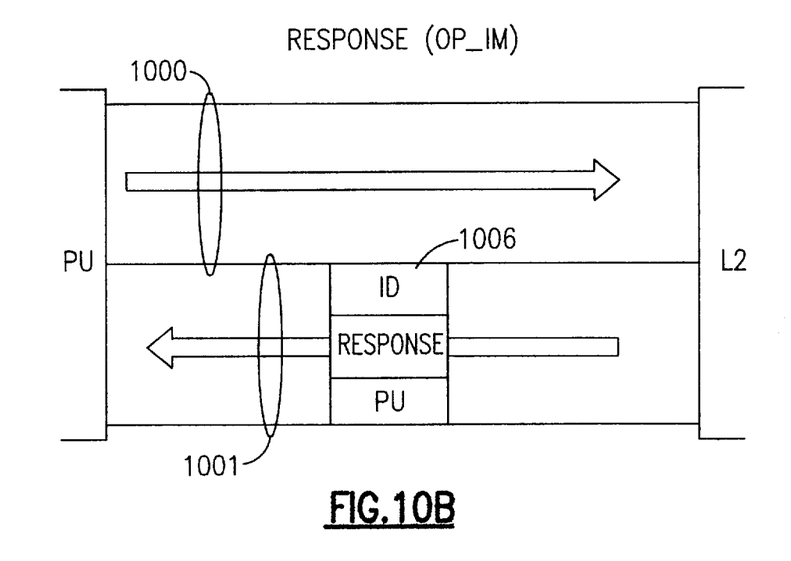
FIG. 10B represents the response to this control command.

FIGS. 10A and 10B depict the sequence of events of the control command with which the PU can carry out writing access to the register of functional units of the computer system. The bus remains in the initial status for the transmission of control commands, and the transmission of the command takes place only on the bus half (1000) from the PU to the L2. In the first two cycles, two OP_IDs (1002, 1003) which contain the ID of the command, the command itself, the number of the chip which is to be accessed and the register address are transmitted. The tag is in the OP_ID status during this.

At the conclusion of these two cycles, two groups of four bytes of information are transmitted, which contain the information to be written into the register. Since only half of the bandwidth is available, a separation into 'High Data' (1004) and 'Low Data' (1005) is required. During transmission of these data items, the tag has the status 'Data.'

FIG. 10B depicts the response 1006 to this control command which is transmitted as an 'Immediate Operation' on bus half (1001) from the L2 to the PU. This response contains the ID of the control command as well as the ID tag of the PU which initiated the control command.

Figure 11A:
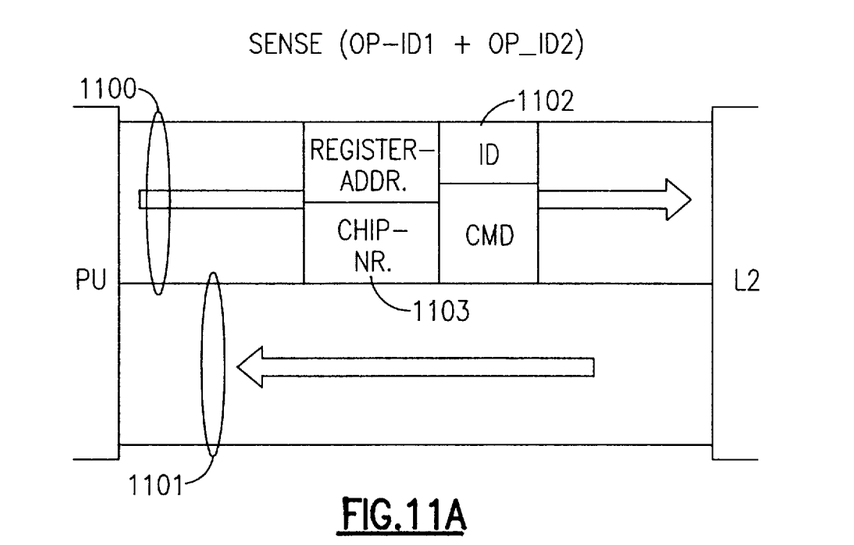
FIG. 11A represents how information on the status of a functional unit can be requested by means of a sense command.

If in the reverse case the register contents of one of the chips belonging to a functional unit of the computer system is to be read out, the PU sends a sense command to the L2. This is represented in FIG. 11A. The sense command transmitted on the bus half (1100) comprises two cycles (1102, 1103) in which the ID of the command, the command itself, the number of the affected chip as well as the register address are communicated. During the communication, the tag shows the coding for OP_ID.

Figure 11B:
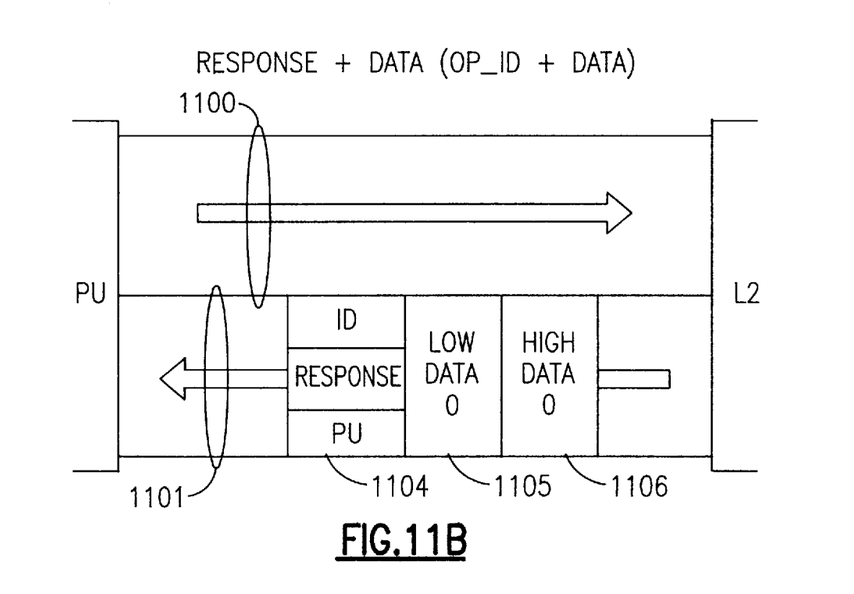
FIG. 11B depicts the response to a sense command.

The status of the register which was read out is communicated with the response to this sense command. This is represented in FIG. 11B. After an 'Operation Identifier' (1104) which contains the ID as well as the ID tag of the PU, two groups of four bytes of data ('Low Data,' 1105 and 'High Data,' 1106) are transmitted to the PU. These data bytes contain the status of the register which was read out. While the tag lines signal OP_ID during the cycle 1104, they indicate that 'Data' are being transmitted during cycles 1105 and 1106.

Figure 12:
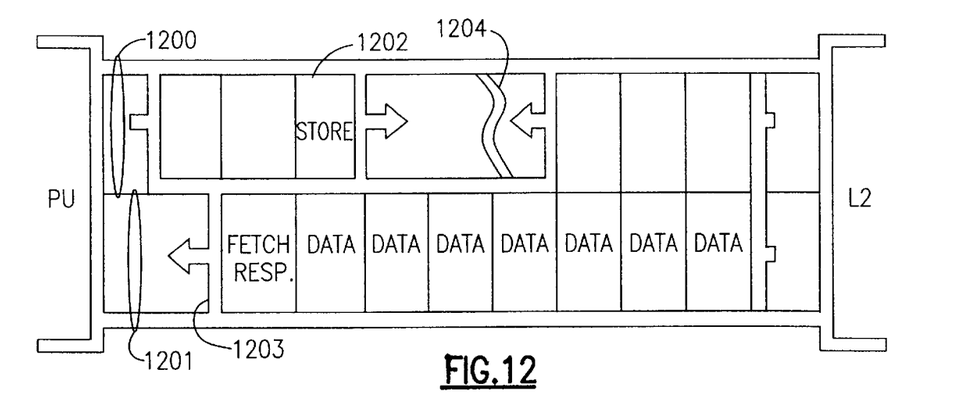
FIG. 12 depicts how the conversion of the bus structure from the initial status to a status of full bandwidth can be delayed in the event that one bus half is still active.

In FIG. 12, the situation is represented that the L2 must communicate a 'fetch response' to the PU, but bus half 1200 from the PU to the L2 is active. In the instance depicted, a store command (1202) is being executed at the time. The L2 can now either wait for the data transmission until bus half 1200 is available again, then reverse the transmission direction of the bus half (1200), and finally transmit the data with full bandwidth from the L2 to the PU. Alternatively, the transmission of the 'fetch response' (1203) may also be started immediately on bus half 1201, and the transmission will thus take place initially with half of the bandwidth. As soon as bus half 1200 is available, its transmission direction can also be reversed (1204), following which the data transmission from the L2 to the PU can be continued with full bandwidth. In this way, flexible utilization of the available bandwidth is made possible.

Figure 13A:
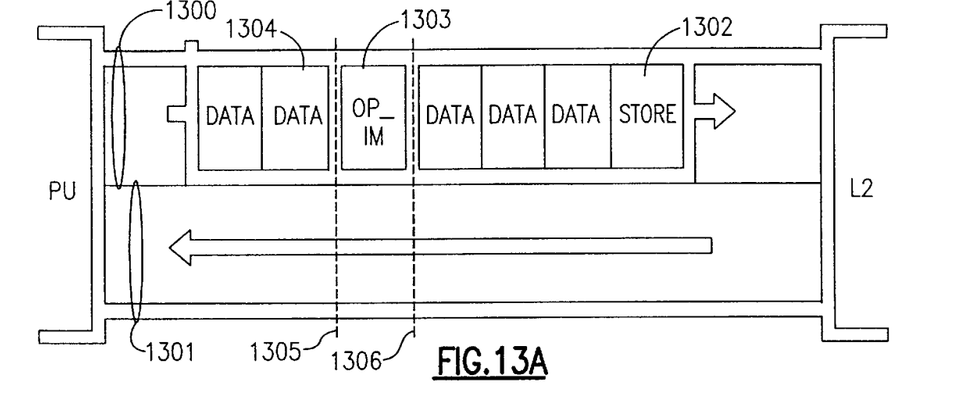
FIG. 13A represents how the transmission of an Immediate Operation ("OP_IM") can be looped into the operation in the same direction during a data transmission on the bus in accordance with the invention.

In FIG. 13A, the situation is represented that the PU wants to communicate an OP_IM to the L2, but bus half 1300 in the initial status provided for this is not available at this time. In the example depicted, bus half 1300 is blocked by the transmission of a store command 1302. In order not to have to wait with the transmission of the OP_IM until the end of the store command, it can be advantageous to interrupt the data transmission (1306), to communicate the OP_IM 1303, and in conclusion to continue (1305) with the transmission of the data (1304). By the possibility of looping an OP_IM into the regular data flow, an accelerated exchange of short instructions between the PU and the L2 is possible.

Figure 13B:
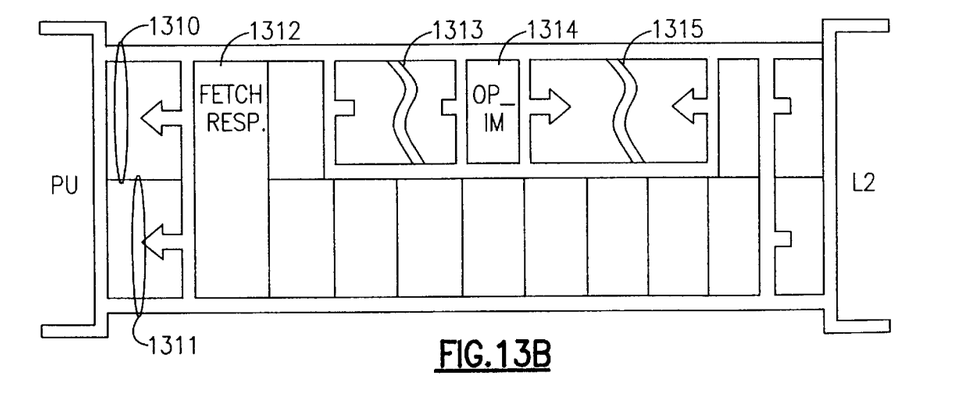
FIG. 13B depicts how, during a data transmission on the bus in accordance with the invention which is using the entire bandwidth, an OP_IM can be transmitted in the opposite direction.

A similar instance is represented in FIG. 13B, in which an OP_IM is to be communicated from the PU to the L2, although both bus halves 1310 and 1311 are blocked by a 'fetch response' (1312). In this case, the data transmission of the 'fetch response' must be limited initially to half of the bandwidth. After this, the transmission direction on bus half 1310 can be inverted (1313). After the transmission of the OP_IM 1314 from the PU to the L2, the transmission direction of bus half 1310 is switched again, in order to make the full bandwidth available for the continuation of the fetch response. This solution also serves for an accelerated exchange of 'immediate operations' between the PU and the L2.

We claim:

1. A bus apparatus for transferring information between a first element and a second element in a data processing system, said bus apparatus comprising a set of data lines for the transfer of data, addresses and commands and a separate set of tag lines for the transfer of control signals, the bus apparatus comprising:

a reduced bandwidth status wherein the set of data lines is partitioned into two subsets of data lines with a first of said subsets of data lines having a transmission direction from said first element to said second element and a second of said subsets of data lines having a transmission direction from said second element to said first element, said reduced bandwidth status permitting the concurrent transfer of information in both directions between said first element and said second element and wherein the transmission direction of at least one of said subsets of data lines is reversible;

a full bandwidth status wherein the transmission direction of the two subsets of data lines is the same; and a means for switching the bus between the reduced bandwidth status and the full bandwidth status wherein at least one of said tag lines is associated with each of said two subsets of data lines and wherein said associated tag line transfers control signals which are coded to represent the type of information being transferred on the subset of data lines with which it is associated;

and wherein the switching of the bus between the reduced bandwidth status and the full bandwidth status takes place as a function of the coded control signals transferred by the tag lines.

2. A bus apparatus in accordance with claim 1 wherein:

the data lines of the first of said subsets of data lines are bi-directional lines whose transmission direction is reversible; and the data lines of the second of said subsets of data lines are unidirectional lines whose transmission direction is fixed.

3. A bus apparatus in accordance with claim 1 wherein:

the data lines of said first of said subsets of data lines and said second of said subsets of data lines are bi-directional lines whose transmission direction is reversible.

4. A bus apparatus in accordance with claim 1 wherein:

the transmission of said control signals through the tag lines takes place a fraction of a timing cycle earlier than the transmission of information through the associated data lines.

5. A bus apparatus in accordance with claim 1 wherein:

in the event that the bus apparatus is in the reduced bandwidth status, and in the event that information is to be subsequently transmitted in a single transmission direction, and wherein the bus apparatus is still transmitting information in the transmission direction which is opposite to the single transmission direction, the switching of the bus between the reduced bandwidth status and the full bandwidth status is delayed until the bus activity in the opposite transmission direction is completed.

6. A method for transferring information over a bus apparatus between a first element and a second element in a data processing system, said bus apparatus comprising a set of data lines for the transfer of data, addresses and commands and a separate set of tag lines for the transfer of control signals, the method comprising the steps of:

implementing a reduced bandwidth status for said bus apparatus wherein the set of data lines is partitioned into two subsets of data lines with a first of said subsets of data lines having a transmission direction from said first element to said second element and a second of said subsets of data lines having a transmission direction from said second element to said first element, said reduced bandwidth status permitting the concurrent transfer of information in both directions between said first element and said second element and wherein the transmission direction of at least one of said subsets of data lines is reversible;

implementing a full bandwidth status wherein the transmission direction of the two subsets of data lines is the same; and switching the bus between the reduced bandwidth status and the full bandwidth status wherein at least one of said tag lines is associated with each of said two subsets of data lines and wherein said associated tag line transfers control signals which are coded to represent the type of information being transferred on the subset of data lines with which it is associated;

and wherein the step of switching the bus between the reduced bandwidth status and the full bandwidth status takes place as a function of the coded control signals transferred by the tag lines.

7. A method in accordance with claim 6 wherein:

the data lines of the first of said subsets of data lines are bi-directional lines whose transmission direction is reversible; and the data lines of the second of said subsets of data lines are unidirectional lines whose transmission direction is fixed.

8. A method in accordance with claim 6 wherein:

the data lines of said first of said subsets of data lines and said second of said subsets of data lines are bi-directional lines whose transmission direction is reversible.

9. A method in accordance with claim 6 wherein:

said control signals are transmitted through the tag lines a fraction of a timing cycle earlier than the transmission of information through the associated data lines.

10. A method in accordance with claim 6 wherein:

in the event that the bus apparatus is in the reduced bandwidth status, and in the event that information is to be subsequently transmitted in a single transmission direction, and wherein the bus apparatus is still transmitting information in the transmission direction which is opposite to the single transmission direction, the switching of the bus between the reduced bandwidth status and the full bandwidth status is delayed until the bus activity in the opposite transmission direction is completed.

\* \* \* \* \*